United States Patent Office 3,140,284
Patented July 7, 1964

3,140,284
NEW PHENOTHIAZINE DERIVATIVES AND A PROCESS FOR THE PRODUCTION THEREOF
Ernst Habicht and Georg Feth, Schaffhausen, Switzerland, assignors to Cilag-Chemie Limited, Schaffhausen, Switzerland, a Swiss company
No Drawing. Filed Feb. 1, 1961, Ser. No. 86,289
Claims priority, application Switzerland Feb. 5, 1960
7 Claims. (Cl. 260—243)

The present invention relates to new phenothiazine derivatives having valuable pharmacological properties, as well as a process for the production thereof.

Phenothiazine derivatives of the general formula

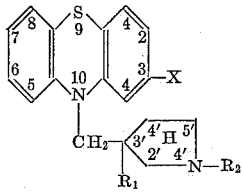

(I)

wherein X represents hydrogen or chlorine, $R_1$ represents methyl, ethyl, propyl, methoxyethyl or methylmercaptoethyl, and $R_2$ represents methyl or ethyl, as well as their acid addition salts, have not been known up to now.

We have now found that phenothiazine derivatives of the above given Formula I have pharmacologically valuable properties. They can be used as antihistaminics, ganglioplegics, anticonvulsants, and for the potentiation of analgetically or hypnotically acting substances. They find their particular application in the psychiatric practice as transquilizers.

The German Patent No. 1,049,382, held by Cilag Aktiengesellschaft (now Cilag-Chemie Aktiengesellschaft), describes phenothiazine derivatives of the formula

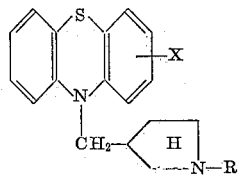

(II)

wherein R signifies hydrogen, an alkyl, alkenyl or benzyl radical, and X is hydrogen or a halogen atom. A comparative screening between representatives of the present invention and of the above indicated German patent showed that the new substances have certain advantages and surprising activities over the known substances.

Thus, the hydrochloride of the 10-[1'-methyl-pyrrolidyl-(3')-methyl]phenothiazine (disclosed in German Patent No. 1,049,382)—referred to hereinafter as substance A—was subjected to a comparative test as to toxicity, spasmolytic activity, antihistaminic effect, anticolinergic effect and ganglionic blocking effect with the product of the present application, the hydrochloride of the 10-[1',3'-dimethyl-pyrrolidyl - (3') - methyl]-phenothiazine—hereinafter referred to as substance B.

The toxicity was determined on white mice by intravenous application.

The spasmolytic activity was tested on the duodenum of the surviving rabbit intestine in tyrode solution with the acetyl choline and the barium chloride contraction. Atropine and papaverine served as standard. As expression of the efficacy is given the dose ratio (substance: standard=1) capable of relieving the spasm. The test on antihistamine efficacy was accomplished on the guinea pig intestine; as standard was used diphenhydramine. The anticholinergic activity was tested on the acetylcholine contracted uterus of the rat, and the ganglionic blocking effect on the nictitating membrane of the cat.

The following results were obtained:

| Kind of Test | Substance A | Substance B |
|---|---|---|
| Toxicity: $LD_{50}$ mg./kg. mouse | 33.5 | 50.0. |
| Spasmolysis: | | |
| (a) Acetylcholine contraction A and B, respectively/Atropine. | 34.2:1 | 18.8:1. |
| (b) Bariumchloride contraction A and B, respectively/Papaverine. | 4.8:1 | 2.1:1. |
| Antihistamine Effect: A and B, respectively/Diphenhydramine. | 3.1:1 | 4.1:1. |
| Anticholinergic Activity: Final concentration of A and B, respectively, capable of causing a 50% inhibition. | 1.0:3,000,000 | 1.0:20,000,000. |
| Ganglionic blocking Effect: Inhibition of the nictitating membrane contraction, 2 mg. A and B, respectively, i.v./kg. cat. | 65% inhibition fugitive effect. | 80% inhibition lasting for several hours. |

It is surprising that by introducing an alkyl group into the 3'-position of a 10-[1'-alkyl-pyrrolidinyl-(3')-methyl]-phenothiazine there is obtained, with maintenance of the compatibility, a general and partially considerable increase of the effect. It is particularly surprising that substance A causes only a fugitive 65% ganglionic blocking, whereas substance B causes a 80% ganglionic blocking lasting for several hours. An increase of the antihistamine effect does not occur, rather a slight decrease, which, however, is not considered a disadvantage, since with tranquilizers no particular importance is attached to strong antihistamine effect.

The new phenothiazines of the Formula I show a further surprising technical advantage over the phenothiazines of the Formula II. When subjecting salts of the phenothiazines of the Formula II either in solid or in aqueous solution to light, they discolor fairly quickly; aqueous solutions show after a few days a red to violet color, and the solid salts are discolored in the same manner after a few weeks. Contrary thereto, the phenothiazines of the Formula I and their salts show practically no discoloration even after having been left standing for months under equal conditions.

The new phenothiazine derivatives of the Formula I can be produced by reacting a phenothiazine of the formula

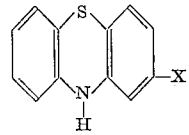

(III)

wherein X has the meaning mentioned hereinbefore, or a N-metal compound of such a phenothiazine, with a reactive ester of a 3-hydroxymethyl pyrrolidine of the formula

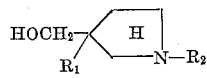

(IV)

wherein $R_1$ and $R_2$ have the meaning mentioned here above. As reactive esters of 3-hydroxymethyl pyrrolidines of the Formula IV are used esters of strong acids, such as for instance the hydrohalide esters or the esters of organic sulfonic acids, such as for instance the esters of the alkyl and the aryl-sulfonic acids, especially the esters with p-toluene-sulfonic acid.

The reaction is preferably carried out in a solvent at its boiling point or in a diluent such as benzene, toluene, xylene, dioxane, dimethyl-formamide, pyridine or any other solvent suitable for such reactions. We prefer to use xylene, dioxane or pyridine. The process is performed in the presence of an alkaline condensing agent, such as for instance an alkaliamide, alkali oxide, alkali-hydride, etc. We prefer to use lithium amide. It is thereby also possible to prepare first a metal salt of a phenothiazine of the Formula III and to then react it with a reactive ester of a 3-hydroxymethyl pyrrolidine of the Formula IV.

It is of course also possible to prepare first a N-magnesyl salt of the phenothiazine, for instance by means of an alkyl-magnesium halide, and to react this N-magnesyl salt with a reactive ester of a 3-hydroxymethyl pyrrolidine of the Formula IV.

The phenothiazines defined in Formula I can likewise be produced by reacting a phenothiazinyl-10-carboxylic acid halogenide of the formula

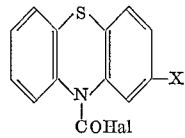

(V)

with a 3-hydroxymethyl pyrrolidine of the Formula IV and to heat the resulting ester of the formula

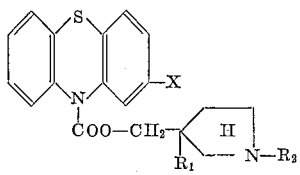

(VI)

until termination of the splitting of $CO_2$.

The preparation of phenothiazinyl-carboxylic acid halogenides of the Formula V and their reaction with 3-hydroxymethyl pyrrolidines of the Formula IV is done according to known processes (cf DAS 1,011,887 and Canadian Patent No. 515,178).

The splitting of $CO_2$ is brought about by heating in the presence or absence of a solvent or a diluent.

As a rule, the temperatures to be used are to be higher than the ones required for the obtainment of 10-dialkyl-aminoalkylphenothiazines (150–220° C.); with sufficient speed the splitting of $CO_2$ sets in only at 230° C. The most advantageous temperature lies between 230 and 250° C.; of course the easiness with which $CO_2$ splits off depends on the constitution of the compound.

Instead of the basic ester, it is possible to subject to the splitting of $CO_2$ also a salt thereof, such as for instance the hydrochloride, sulfate, etc.

As solvent and diluent, respectively, can be used: diphenylether, diphenyl, diphenylmethane, etc.

The thus resulting 10-pyrrolidyl methyl phenothiazines can be isolated in form of their salts with inorganic or organic acids, of which are particularly suited the hydrochloric acid, the sulfuric acid or the phosphoric acid, as well as organic acids such as methane-sulfonic acid, fumaric acid, maleinic acid, citric acid, etc.

The transformation of the pyrrolidyl methyl phenothiazines into their quaternary salts is performed by means of alkyl halogenides, alkyl sulfates or alkylalkane sulfonates in inert solvents, such as for instance in ether, ethyl acetate, etc.

The 3-hydroxymethyl pyrrolidines defined in Formula IV are valuable intermediary products. Besides the use here defined they can also be used for the production of spasmolytically active substances by reaction with specific carboxylic acids, for the production of antiallergic substances by reaction wtih active halogeno compounds, etc. The 3-halogenomethyl pyrrolidines can likewise be condensed with specific diaminoethanes for the production of psychotropic agents.

The preparation of these 3-hydroxymethyl pyrrolidines and of the reactive esters thereof to be used as intermediary products is done in the following manner:

A $R_1$-substituted malonic acid ester is reacted in a manner known per se with an aminoethyl halogenide of the formula

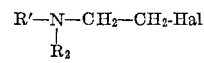

(VII)

whereby a malonic acid ester of the formula

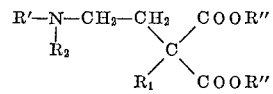

(VIII)

is obtained. In this formula R' represents a radical which can be split off by hydrogenolysis, such as for instance benzyl, benzhydryl, trityl, carbobenzoxy, etc., and R'' is alkyl or aryl, preferably methyl or ethyl. An ester of the Formula VIII is now subjected to catalytic hydrogenation, whereby the radical R' is substituted by H, cyclisation to the pyrrolidone of the formula

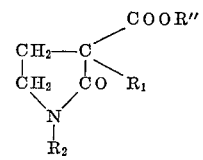

(IX)

taking place simultaneously. As catalysts are taken the usual ones, such as for instance palladium/charcoal, Raney-nickel, etc. The hydrogenolytic splitting of the radical R' takes place already under normal pressure and at room temperature in a lower alcohol as solvent, such as for instance methanol, ethanol or propanol. It is of course also possible to hydrogenate at elevated temperature and under increased pressure.

The thus resulting pyrrolidone of the Formula IX is now transformed by means of a reducing agent usual in such cases, for instance $LiAlH_4$, sodium in butanol, into the 3-hydroxymethyl pyrrolidine of the formula

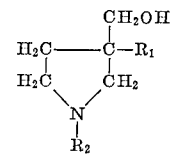

(IV)

The latter can be transformed by means of halogenating agents, such as for instance HBr in methanol, thionyl chloride in chloroform, phosphorus halogenides in tetra, etc., into a respective halogeno methyl compound.

It is, however, also possible to transform the 3-hydroxymethyl pyrrolidines of the Formula IV into their esters with organic sulfonic acids, for instance by means of mesyl chloride or tosyl chloride in the presence of pyridine or another tertiary base. Such sulfonic acid esters likewise condense easily with phenothiazine or a phenothiazine salt.

EXAMPLE 1

(a) *Diethyl-α-(N-Benzyl-N-Methyl-Aminoethyl)-α-Methyl Malonate*

Into a suspension of 11 g. of sodium in 150 cc. of anhydrous xylene, prepared in known manner, are allowed to flow in a thin jet 116 g. of diethyl-α-methyl malonate in 100 cc. of anhydrous benzene. The sodium salt forms with self-heating. The whole is held for ½ hour at 80–90° C. while mechanically stirring. Subsequently, 80 g. of N-benzyl-N-methyl-aminoethyl chloride in 100 cc. of benzene are added in small portions. The whole is stirred mechanically for 7 hours with reflux heating. After cooling, the batch is treated with ice and water, the benzene/xylene layer is separated off and the latter extracted with ice water and then with 2 N hydrochloric acid. The combined aqueous extracts are washed with ether and then rendered alkaline by means of saturated aqueous potassium carbonate solution. The separating oil is taken up in ether, the ethereal solution dried and then evaporated. The residue is distilled under high vacuum. There are obtained 90 g. of the title substance, which boils under 0.04 mm. Hg pressure at 131–133° C. The yield is 58% of the theoretical value.

Larger batches give, as a rule, satisfactory yields. When reacting for instance in a manner analogous to that described here above 348 g. of diethyl-α-methyl-malonate with 247 g. of benzyl methylamino-ethyl chloride in the presence of 32.7 g. of sodium and working up as prescribed, there are obtained 320.2 g. of the malonic acid ester captioned here above, which corresponds to 74% of the theoretical value.

In a manner analogous to that described it is possible to obtain the following diethyl malonates of the general formula

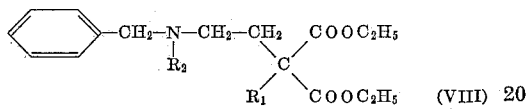

(VIII)

| R₂ | R₁ | Reaction period, hrs. | Yield, percent | B.P., °C./mm. Hg |
|---|---|---|---|---|
| —CH₃ | —C₂H₅ | 7 | 73 | 130–133/0.08 |
| —CH₃ | —C₃H₇n | 10 | 88 | 149–153/0.09 |
| —CH₃ | —CH₂—CH₂—O—CH₃ | 10 | 89 | 164–167/0.1 |
| —CH₃ | —CH₂—CH₂—S—CH₃ | 10 | 72 | 163–164/0.1 (HCl-salt: M.P., 81–82° C.) |
| —C₂H₅ | —CH₃ | 7 | 73 | 138–143/0.08 |
| —C₂H₅ | —C₂H₅ | 10 | 74 | 143–146/0.05 |
| —C₂H₅ | —C₃H₇n | 10 | 86 | 148–152/0.5 |
| —C₂H₅ | —C₂H₄—OCH₃ | 10 | 87 | 157–163/0.08 |

(b) *Ethyl-1,3-Dimethyl-2-Pyrrolidone-3-Carboxylate*

80 g. of the diethyl malonate obtained according to (a) are hydrogenated in 300 cc. of anhydrous ethanol in the presence of 15 g. of 5% palladium/charcoal catalyst under normal pressure and at room temperature. The quantity calculated of hydrogen is taken up within approx. 30 minutes. The catalyst is filtered off with suction and the filtrate concentrated in vacuo. The residue is then distilled in vacuo. There are obtained 35 g. of the ethyl-pyrrolidone-carboxylate captioned here above, which boils under 13 mm. Hg pressure at 140–145° C. The yield corresponds to 72% of the theoretical value. When working with larger batches yields of up to 95% of the theoretical value are obtained quite easily.

The pyrrolidone-carboxylic acid ester of the formula

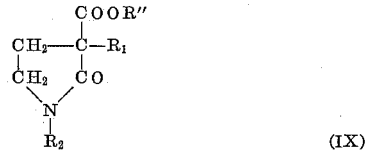

(IX)

can likewise be obtained by allowing a reactive ester of an alcohol R₁OH to act on a 1-substituted 2-pyrrolidone-3-carboxylic acid ester in the presence of an alkaline condensing agent. This reaction can for instance be performed in the following manner:

110 g. of ethyl-1-methyl-2-pyrrolidone-3-carboxylate in 200 cc. of benzene are allowed to flow within 25 minutes to a suspension of 15.1 g. of sodium in 600 cc. of anhydrous xylene. Under heating to 60° C. is formed the sodium salt of the ethyl-pyrrolidone-carboxylate. The whole is stirred for ½ hour at 80–85° C. 95 g. of β-methyl-thioethylchloride in 100 cc. of anhydrous benzene are allowed to flow in and the whole is stirred for 50 hours at boiling temperature. Cooling is followed by treatment with 120 cc. of ice water, mechanical stirring and separation of the aqueous layer. The organic layer is washed twice with water and then dried over K₂CO₃. The solvent is distilled off, after which follows fractioning under high vacuum. There are obtained 96 g. of ethyl 1 - methyl - 2 - pyrrolidone-3-(β-methylthioethyl)-3-carboxylate, which boils under 0.07 mm. at 122–124° C.

In a manner analogous to that described under par. (b) or here above are obtained the following ethyl-2-pyrrolidone-3-carboxylates of the formula

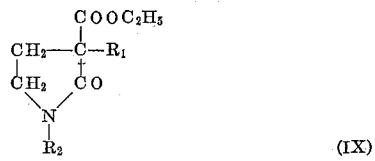

(IX)

| R₁ | R₂ | B.P., °C./mm. Hg | Yield in percent |
|---|---|---|---|
| —C₂H₅ | —CH₃ | 141–146/11 | 92 |
| —C₃H₇ n | —CH₃ | 88–93/0.07 | 95 |
| —C₂H₄OCH₃ | —CH₃ | 101–104/0.1 | 89 |
| —C₂H₄—S—CH₃ | —CH₃ | 122–124/0.07 | 65 |
| —CH₃ | —C₂H₅ | 88–91/0.03 | 83 |
| —C₂H₅ | —C₂H₅ | 83–87/0.05 | 96 |
| —C₃H₇ | —C₂H₅ | 93–97/0.04 | 94 |
| —CH₂—CH₂—O—CH₃ | —C₂H₅ | 106–110/0.07 | 95 |

(c) *1,3-Dimethyl-3-Hydroxymethyl Pyrrolidine*

31 g. of the ethyl pyrrolidone-carboxylate obtained according to (b) are reduced in the usual manner in a mixture of 100 cc. of dioxane and 100 cc. of tetrahydrofuran by means of 19 g. of LiAlH₄ (10 hours of stirring at 80° C. under nitrogen atmosphere). Subsequent decomposition with water is followed by alkalization, filtration of the separating solid masses and washing with dioxane. The filtrate, consisting of organic solvent mixture, is evaporated and the residue distilled in vacuo. There are thereby obtained 16 g. of the 1,3-dimethyl-3-hydroxymethyl pyrrolidine, which forms a colorless liquid boiling under 15 mm. Hg pressure at 84–87° C. The new pyrrolidine forms a series of readily soluble salts, among which particularly the hydrochloride and the sulfate excel for their hygroscopicity. The picrate of the pyrrolidine is comparatively difficultly soluble.

In a manner analogous to that described here above there are obtained the following 3-hydroxymethyl pyrrolidines of the general formula

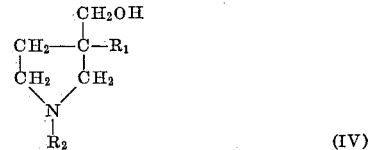

(IV)

| R₂ | R₁ | Yield in percent | B.P., °C./mm. Hg |
|---|---|---|---|
| —CH₃ | —C₂H₅ | 81 | 93–96/11 |
| —CH₃ | —C₃H₇ | 79 | 107–110/12 |
| —CH₃ | —CH₂—CH₂—O—CH₃ | 89 | 121–124/11 |
| —CH₃ | —CH₂—CH₂—S—CH₃ | 77 | 94–96/0.07 |
| —C₂H₅ | —CH₃ | 82 | 89–93/12 |
| —C₂H₅ | —C₂H₅ | 86 | 103–106/12 |
| —C₂H₅ | —C₃H₇ | 82 | 117–119/13 |
| —C₂H₅ | —C₂H₄OCH₃ | 87 | 130–135/12 |

(d) *1,3-Dimethyl-3-Chloromethyl Pyrrolidine*

76.5 g. of 1,3-dimethyl-3-hydroxymethyl pyrrolidine in 350 cc. of anhydrous chloroform are treated while cooling with ice and mechanically stirring with a solution of 84 g. of thionyl chloride in 120 cc. of anhydrous chloroform. The batch is allowed to slowly reach room temperature and is then heated carefully within 3 hours to boiling. After a further 3 hours the whole is cooled off and the solvent evaporated in vacuo. The residue is triturated with ether, the resulting crystallisate treated with ether and then sucked off. After recrystallization from anhydrous acetone/anhydrous ether there are obtained 110 g. of the hydrochloride of the 1,3-dimethyl-3-chloromethyl pyrrolidine, which melts at 109° C. It forms nearly colorless crystals, which are strongly hygroscopic. The base can easily be set free from the hydrochloride by means of concentrated aqueous sodium hydroxide solution and ether. It can be distilled in vacuo, without being decomposed considerably. The boiling point is 52–54° C. under 12 mm. Hg pressure.

In a manner analogous to that described here above the following 3-chloromethyl-pyrrolidines of the formula

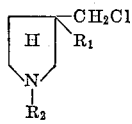

can be produced:

| R₂ | R₁ | B.P., °C/ mm. Hg | M.P., °C. hydrochloride | Yield in percent |
| --- | --- | --- | --- | --- |
| —CH₃ | —C₂H₅ | 73/13 | 162–164 | 87 |
| —CH₃ | —C₃H₇n | 88–89/13 | 146–147 | 75 |
| —CH₃ | —C₂H₄—O—CH₃ | | 120–122 | 89 |
| —CH₃ | —C₂H₄—S—CH₃ | | Deliquescent. | 65 |
| —C₂H₅ | —CH₃ | 67–70/12 | | 89 |
| —C₂H₅ | —C₂H₅ | 82–83/12 | 136–137 | 86 |
| —C₂H₅ | —C₃H₇n | 98–99/13 | 120–121 | 90 |
| —C₂H₅ | —C₂H₄—O—CH₃ | | Deliquescent. | 93 |

EXAMPLE 2

*10-[1',3'-Dimethyl-Pyrrolidyl-(3')-Methyl]-Phenothiazine*

55 g. of phenothiazine in 190 cc. of anhydrous xylene are heated with 6.3 g. of lithium amide for ½ hour while stirring and under exclusion of air. To the resulting solution of the lithium salt is dropped a solution of 35 g. of 1,3-dimethyl-3-chloromethyl pyrrolidine in 45 cc. of anhydrous xylene. The whole is heated for 45 hours to boiling while stirring. After cooling it is treated with 100 cc. of water, the solid parts are sucked off and washed with benzene. The aqueous layer is separated from the filtrate, and the xylene layer is washed repeatedly with water. After drying over sodium carbonate the organic layer is concentrated in vacuo and the residue is shaken well with ether and 100 cc. of 2 N acetic acid. The ethereal layer is likewise extracted with 2 N acetic acid, the acid aqueous solutions are combined and rendered alkaline by means of sodium hydroxide. The separating oil is taken up in ether. The ethereal solution is dried and evaporated, and the residue is distilled under high vacuum. There are obtained 35 g. of the title substance, which boils under 0.04 mm. Hg pressure at 168–173° C. The new phenothiazine derivative forms, when raw, a yellow oil, which is readily soluble in dilute mineral acids. After distilling the oil solidifies to colorless crystals, which melt at 100–101° C. after having been recrystallised from petroleum ether. The hydrochloride can be produced from the base by means of ethereal hydrochloric acid. The hydrochloride melts in raw condition at 183–185° C. and after recrystallisation from anhydrous ether/anhydrous ethanol at 185–187° C.

EXAMPLE 3

*10-[1'-Methyl-3'-Ethyl-Pyrrolidyl-(3')-Methyl]-Phenothiazine*

33 g. of phenothiazine and 3.7 g. of lithium amide in 115 cc. of anhydrous xylene are heated for 30 minutes to reflux while mechanically stirring. A solution of 22.4 g. of 1-methyl-3-ethyl-3-chloromethyl pyrrolidine in 30 cc. of anhydrous xylene is then added dropwise thereto. The whole is now heated to boiling for 45 hours while stirring. Cooling is followed by treatment with water, filtration of the solution and washing of the filtrate with benzene. The xylene/benzene layer is separated off and washed three times with water. After drying over K₂CO₃ the whole is concentrated and the residue taken up in ether. The ethereal solution is extracted twice with 2 N acetic acid, and the combined acid aqueous extracts are rendered alkaline. There separates immediately a solid precipitate, which is taken up in ether. The ethereal solution is first filtered and then evaporated. The remaining semi-solid mass is recrystallised from petroleum ether. There are obtained 15 g. of the phenothiazine derivative captioned here above, which melts at 128–129° C.

The hydrochloride of the base is prepared in a mixture of ether/benzene by means of ethereal hydrochloric acid. It melts at 230–233° C., is moderately soluble in cold water, ethanol and acetone, but readily soluble in hot water, ethanol and acetone. The hydrochloride dissolves readily in cold chloroform, but is practically insoluble in benzene, ether, and petroleum ether.

EXAMPLE 4

*10-[1'-Methyl-3'-n-Propyl-Pyrrolidyl-(3')-Methyl]-Phenothiazine*

41.7 g. of phenothiazine in 145 cc. of anhydrous xylene are heated with 4.7 g. of lithium amide. A solution of 30.7 g. of 1-methyl-3-chloromethyl-3-n-propyl pyrrolidine in 35 cc. of anhydrous xylene is then added dropwise thereto. After 45 hours of stirring and reflux heating there follows working up in a manner analogous to that described in the aforegoing examples. The new phenothiazine derivative, which melts at 97–98° C. after recrystallisation from petroleum ether, is obtained in a yield of 45 g. The hydrochloride of the new phenothiazine melts at 235–237° C. It is little soluble in cold water, but readily soluble in hot water. On the other hand, it dissolves readily in cold chloroform, whereas it is practically insoluble in benzene, ether and petroleum ether.

EXAMPLE 5

*10-[1'-Methyl-3'-β'-Methoxyethyl-Pyrrolidyl-(3')-Methyl]-Phenothiazine*

31 g. of phenothiazine are reacted in the usual manner with 6.7 g. of lithium amide in 110 cc. of anhydrous dioxane. There are added within 45 minutes 30.4 g. of 1 - methyl - 3 - β - methoxyethyl - 3 - chloromethyl pyrrolidine hydrochloride. The whole is heated for 10 hours to boiling while stirring. After working up as indicated in the aforegoing examples, there is obtained the new phenothiazine as nearly colorless oil. The new product is distilled under 0.05 mm. Hg pressure and boils at 187–195° C. There are thereby obtained 32 g. of the wanted phenothiazine. It becomes solid after some standing and can then be recrystallised from petroleum ether, after which it melts at 75–77° C. The yield is 32 g., corresponding to 65% of the theoretical value.

The hydrochloride is prepared in the usual manner and melts, after recrystallisation from ethanol/ether, at 205–207° C. The citrate melts, after recrystallisation from ethanol/ether, at 133–135° C., and the dihydrogenfumarate, recrystallised from acetone/ethanol/ether, at 113–115° C.

EXAMPLE 6

*10-[1',3'-Dimethyl-Pyrrolidyl-(3')-Methyl]-3-Chlorophenothiazine*

26.2 g. of 3-chlorophenothiazine are heated with 2.6 g. of lithium amide in 150 cc. of anhydrous xylene while mechanically stirring. There is added dropwise within 80 minutes a solution of 16.5 g. of 1, 3-dimethyl-3-chloromethyl pyrrolidine in 50 cc. of anhydrous xylene. Subsequently, the whole is heated to boiling for 44 hours while stirring. After working up as indicated in Example 2, 16 g. of the phenothiazine wanted are obtained. It boils under 0.04 mm. Hg pressure at 175–181° C. and melts, after recrystallisation from petroleum ether, at 92–93° C. The hydrochloride of the new phenothiazine melts at 201–203° C. It is readily soluble in water, ethanol and chloroform, little soluble in cold benzene, ether and petroleum ether.

EXAMPLE 7

*10-[1'-Methyl-3'-Ethyl-Pyrrolidyl-(3')-Methyl]-3-Chlorophenothiazine*

42 g. of 3-chlorophenothiazine and 4.2 g. of lithium amide in 250 cc. of anhydrous xylene are heated while mechanically stirring. A solution of 28.5 g. of 1-methyl-3-ethyl-3-chloromethyl pyrrolidine in 30 cc. of anhyrous xylene is dropped thereto within 2 hours. The whole is heated for 44 hours while stirring and then worked up in the usual manner. There are obtained 25 g. of the phenothiazine boiling under 0.1 mm. Hg pressure at 183–190° C. The hydrochloride, prepared in the usual manner, melts at 208–210° C. It is little soluble in cold water and cold ethanol, but readily soluble in hot water and hot ethanol. It dissolves readily in cold chloroform.

EXAMPLE 8

*10-[1'-Methyl-3'-n-Propyl-Pyrrolidyl-(3')-Methyl]-3-Chlorophenothiazine*

31.2 g. of 3-chlorophenothiazine and 3.1 g. of lithium amide in 160 cc. of anhydrous xylene are heated to boiling while stirring. A solution of 23.4 g. of 1-methyl-3-n-propyl-3-chloromethyl pyrrolidine in 30 cc. of anhyrous xylene is dropped thereto within 70 minutes. The whole is then heated to boiling for 45 hours while stirring. After the usual working up there are obtained 23 g. of the phenothiazine wanted. It forms first a colorless to slightly yellow colored oil, which boils under 0.06 mm. Hg pressure at 177–183° C. After solidification of the oil and recrystallisation from petroleum ether there are obtained crystals which melt at 82–83° C.

Thy hydrochloride, prepared in the usual manner, and recrystallised from anhydrous ethanol/anhydrous ether, melts at 230–233° C. It is little soluble in cold water, but readily soluble in hot water. It dissolves readily in cold chloroform, but is practically insoluble in ether and petroleum ether.

EXAMPLE 9

*10-[1'-Ethyl-3'-Methyl-Pyrrolidyl-(-3')-Methyl]-Phenothiazine*

When proceeding according to the indications given in Example 2 and following, 3.9 g. of lithium amide, 34.8 g. of phenothiazine and 23.6 g. of 1-ethyl-3-methyl-3-chloromethyl pyrrolidine in a total of 150 cc. of anhydrous xylene yield 32 g. of the phenothiazine captioned hereabove. It boils under 0.03 mm. Hg pressure at 165–175° C. After distillation the nearly colorless oil solidifies and can be recrystallised from petroleum ether. There are thereby obtained colorless crystals which melt at 71–73° C. The hydrochloride is prepared in the usual manner. It melts at 163-166° C., is readily soluble in cold water, cold ethanol and cold chloroform, dissolves little in benzene, and is practically insoluble in ether and petroleum ether.

EXAMPLE 10

*10-[1',3'-Diethyl-Pyrrolidyl-(3')-Methyl]-Phenothiazine*

When proceeding according to the indications given in the detailed Examples 2 and 3, there are obtained 34 g. of the phenothiazine wanted, starting from 4.8 g. of lithium amide, 42. g. of phenothiazine and 31.4 g. of 1,3-diethyl-3-chloromethyl-pyrrolidine in 200 cc. of anhydrous xylene. The new phenothiazine melts, after recrystallisation from petroleum ether, at 95-97° C.

The hydrochloride, prepared in the usual manner, melts at 178–180° C.

EXAMPLE 11

*10-[1'-Ethyl-3'-n-Propyl-Pyrrolidyl-(3')-Methyl]-Phenothiazine*

When reacting 48 g. of phenothiazine, 5.4 g. of lithium amide and 38 g. of 1-ethyl-3-n-propyl-3-chloromethyl pyrrolidine in 200 cc. of anhydrous xylene and working up in the usual manner, 43 g. of the phenothiazine wanted are obtained. The new phenothiazine boils under 0.05 mm. Hg pressure at 177–183° C. After distillation the oil solidifies, and the solid mass is recrystalised from petroleum ether, thereby leading to the pure compound, which melts at 72–73° C. The hydrochloride is prepared in ether by means of ethereal hydrochloric acid and melts, after recrystallization from anhydrous ethanol-anhydrous ether, at 161–163° C. It dissolves readily in cold water and ethanol, moderately in hot benzene and very little in ether and petroleum ether.

EXAMPLE 12

*10-[1'-Ethyl-3'-β'-Methoxyethyl-Pyrrolidyl-(3')-Methyl]-Phenothiazine*

When heating 38.4 g. of phenothiazine with 8.5 g. of lithium amide in 125 cc. of dioxane for 5 minutes while stirring and adding thereto dropwise within 45 minutes 40 g. of 1-ethyl-3-β-methoxyethyl-3-chloromethyl pyrrolidine and heating for a further 10 hours to boiling while stirring, there are obtained 44 g. of the phenothiazine wanted. The new product boils under 0.03 mm. Hg pressure at 187–195° C.

The hydrochloride of this phenothiazine melts at 173–174° C. It is readily soluble in water, ethanol and chloroform, little soluble in benzene, ether and petroleum ether.

EXAMPLE 13

*10-[1'-Ethyl-3'-Methyl-Pyrrolidyl-(3')-Methyl]-3-Chlorophenothiazine*

By reacting 34.1 g. of 3-chlorophenothiazine with 3.4 g. of lithium amide and subsequently with 23.5 g. of 1-ethyl-3-methyl-3-chloromethyl pyrrolidine in 200 cc. of xylene, there are obtained 28 g. of the phenothiazine boiling under 0.03 mm. at 175-180° C. The hydrochloride of this phenothiazine is produced in the usual manner and melts at 192–195° C.

EXAMPLE 14

*10-[1',3'-Diethyl-Pyrrolidyl-(3')-Methyl]-3-Chlorophenothiazine*

The reaction of 37 g. of 3-chlorophenothiazine with 3.7 g. of lithium amide and subsequently with 27.9 g. of 1,3-diethyl-3-chloromethyl pyrrolidine in 200 cc. of anhydrous xylene yields 26 g. of the phenothiazine boiling under 0.07 mm. Hg pressure at 177–183° C. The new product forms a colorless oil, which solidifies after a short time. Recrystallising it from petroleum ether, there is obtained the pure colorless compound, which melts at 77–79° C.

The hydrochloride, produced in the usual manner, melts at 205–207° C. It dissolves readily in water and ethanol, moderately in hot acetone.

EXAMPLE 15

*10-[1'-Ethyl-3'-n-Propyl-Pyrrolidyl-(3')-Methyl]-3-Chlorophenothiazine*

44 g. of 3-chlorophenothiazine are heated to boiling with 4.4 g. of lithium amide in 225 cc. of anhydrous benzene while stirring mechanically. To this solution are given dropwise within 45 minutes 35.5 g. of 1-ethyl-3-n-propyl-3-chloromethyl pyrrolidine. The whole is heated to boiling for 45 hours while stirring and then processed in a manner analogous to that described in Examples 2 and 3. There are obtained 27 g. of the new phenothiazine, which boils under 0.1 mm. Hg pressure at 175–180° C. It solidifies after distillation and can then be recrystallised from petroleum ether. There is thereby obtained the pure compound in form of colorless crystals, which melt at 79–81° C.

The hydrochloride of the phenothiazine is produced in the usual manner. After having been recrystallised from a mixture of acetone/ethanol/ether, it melts at 191–193° C.

EXAMPLE 16

*10-[1'-Ethyl-3'-β'-Methoxyethyl-Pyrrolidyl-(3')-Methyl]-3-Chlorophenothiazine*

45 g. of phenothiazine and 8.5 g. of lithium amide in 125 cc. of anhydrous dioxane are heated to boiling for 5 minutes while stirring mechanically. There are added within 60 minutes 40 g. of 1-ethyl-3-β-methoxyethyl-3-chloromethyl pyrrolidine in 70 cc. of anhydrous dioxane. The whole is then heated to boiling for 12 hours while stirring, cooled, treated with 50 cc. of water, and the reaction mixture then concentrated in vacuo. The residue is shaken with water and ether, the ethereal solution separated off and extracted three times with 75 cc. each of 2 N acetic acid. The combined aqueous extracts are washed with ether, then treated with concentrated aqueous sodium hydroxide, and the separating oil is taken up in ether. The ethereal solution is washed with water, dried and evaporated. The residue, after having been distilled under high vacuum, yields 35 g. of the new phenothiazine, which boils under 0.1 mm. Hg pressure at 204–206° C.

When treating 33.5 g. of the thus resulting phenothiazine in 400 cc. of anhydrous ether with 38 cc. of 3.8 N ethereal hydrochloric acid and allowing the whole to stand for 2 days, there are obtained 33.5 g. of the hydrochloride. After having been recrystallised from ethanol/ether, it melts at 206–207° C. The hydrochloride is little soluble in cold water, readily soluble in chloroform and ethanol, very little soluble in ether and petroleum ether.

EXAMPLE 17

*10-[1'-Methyl-3'-n-Propyl-Pyrrolidyl-(3')-Methyl]-Phenothiazine*

24.2 g. of phenothiazine-10-carboxylic acid chloride in 300 cc. of anhydrous benzene are stirred for 14 hours at 120° C. oil-bath temperature with 32 g. of 1-methyl-3-n-propyl-3-hydroxymethyl pyrrolidine. The whole is allowed to stand for 48 hours and the reaction solution is then shaken with water and dilute acetic acid. The aqueous acid solution is rendered alkaline by means of sodium hydroxide, and the separating oil is taken up in benzene. After drying of the solvent over $K_2CO_3$ there follows evaporation, and the residue is then triturated with little petroleum ether, which causes immediate crystallisation. After recrystallisation from petroleum ether, 25 g. of phenothiazine-10-carboxylic acid-[1'-methyl-3'-n-propyl-pyrrolidyl-(3')-methyl]-ester are obtained. The new product melts at 86–87° C.

5 g. of the thus resulting ester are heated in a glass flask to 240–250° C. until the splitting of $CO_2$ has ended (6–8 hours). After standing over night, the crystalline substance is recrystallised from petroleum ether. There are obtained 3 g. of the phenothiazine wanted, which shows a melting point of 97–98° C. The new phenothiazine corresponds in all its properties to the derivative obtained according to Example 4.

EXAMPLE 18

*10-[1'-Methyl-3'-β'-Methoxyethyl-Pyrrolidyl-(3')-Methyl]-3-Chlorophenothiazine*

46 g. of 3-chlorophenothiazine and 8.8 g. of lithium amide in 125 cc. of anhydrous dioxane are heated to boiling for 5 minutes while stirring. A solution of 39 g. of 1-methyl-3-β-methoxyethyl-3-chloromethyl pyrrolidine in 70 cc. of dioxane is added dropwise within 45 minutes. The whole is heated to boiling for 12 hours while stirring. Subsequent cooling is followed by treatment with 75 cc. of water, and the reaction mixture is concentrated in vacuo. The residue is shaken with ether, the ethereal layer separated and then extracted four times with 75 cc. each of 2 N acetic acid. The acid aqueous extracts are washed with ether, then rendered alkaline with sodium hydroxide, and the separating oil is taken up in ether. After drying, the ethereal solution is evaporated, and the residue is distilled in vacuo. There are obtained 41 g. of the phenothiazine captioned above, which boils under 0.05 mm. Hg pressure at 198–204° C. The thus purified phenothiazine forms a colorless oil, which soon solidifies. After recrystallisation from petroleum ether, it melts at 89–91° C. The hydrochloride of the phenothiazine melts at 223–225° C. It dissolves readily in hot water, hot ethanol and cold chloroform, but is insoluble in ether and petroleum ether.

EXAMPLE 19

*10-[1'-Methyl-3'-n-Propyl-Pyrrolidyl-(3')-Methyl]-Phenothiazine*

14.15 g. of 1-methyl-3-n-propyl-3-hydroxymethyl pyrrolidine and 30 cc. of anhydrous pyridine are given into a flask. To this solution is added dropwise within 20 minutes while stirring and cooling at −20° C. to −30° C. a solution of 20. g. of p-toluene-sulfonyl chloride in 30 cc. of anhydrous pyridine. Stirring at −20° C. to −30° C is continued for 30 minutes and the temperature then allowed to slowly rise to 0° C. The whole is now stirred for 2 hours at 0–5° C. and then for another 4 hours at room temperature. The pyridine is subsequently distilled at as low a temperature as possible, and the residue is poured on ice. The aqueous solution is acidified to Congo red by means of hydrochloric acid and then shaken with 200 cc. of ether. The aqueous solution is alkalised to phenolphthalein and the separating oil is taken up in ether. The ethereal solution is washed three times with 150 cc. of water and then dried over $K_2CO_3$. The ether is now distilled off, and the residue, which represents the tosyl ester, used without any further purification. The picrate of the tosyl ester can be prepared in isopropanol; it melts at 151.5–152.5° C.

18.1 g. of phenothiazine in 25 cc. of anhydrous pyridine are given into a flask. The air is excluded by means of nitrogen. There are now added 1.77 g. of lithium amide and the whole is heated under nitrogen atmosphere to 90° C. while stirring. The lithium amide goes into solution with simultaneous evolution of ammonia. Stirring is continued for 10 minutes at 95–105° C. and then for another 20 minutes at 125–133° C. The temperature is now cooled down to 20° C. and the tosyl ester, having been dissolved in 25 cc. of anhydrous pyridine, is added dropwise within 10 minutes. The whole is now heated to 90° C., whereby condensation sets in with simultaneous evolution of heat. After the reaction has ended, the whole is heated for 15 minutes to boiling and then cooled down to 20° C. The batch is poured on ice and then acidified by means of dilute hydrochloric acid. The greasy precipitate is separated from the aqueous phase and dissolved in 60 cc. of glacial acetic acid. The solution is diluted with 150 cc. of water and then filtered with suction; there are thereby recovered 8 g. of unchanged phenothiazine. The filtrate is rendered alkaline and then extracted with ether. The ethereal solution is washed twice with water, dried over K₂CO₃, filtered and evaporated. There are obtained 17.5 g. of the title substance, first in form of an oil, which after a short time crystallises. After recrystallisation from petroleum ether the pure phenothiazine melting at 97–98° C. is obtained. It corresponds in all its properties to the phenothiazine obtained according to Example 4.

EXAMPLE 20

*10-[1'-Methyl-3'-β'-Methylmercaptoethyl-Pyrrolidyl-(3')-Methyl]-Phenothiazine*

19 g. of 1-methyl-3-β-methylmercaptoethyl-3-hydroxymethyl-pyrrolidine and 24 g. of p-toluenesulfochloride in 70 cc. of anhydrous pyridine are transformed into the p-tosylester. (Processing and working up as described in Example 19.) The yield is 26 g. The thus resulting tosyl ester, after having been recrystallised from petroleum ether, melts at 44–47° C.

19.3 g. of phenothiazine are transformed into the lithium amide by means of 1.9 g. of lithium amide in 30 cc. of anhydrous pyridine. There are added thereto 25 g. of the above resulting tosyl ester in 25 cc. of anhydrous pyridine, and the whole is heated to 100° C., whereby the condensing reaction begins with self-heating. After the reaction has subsided, heating to boiling is continued for 15 minutes, followed by cooling down to 20° C. The whole is treated with water and then evaporated in vacuo to dryness. The residue is shaken well with ether and water, and the ethereal solution is separated and washed with water. The ethereal solution is now extracted six times with 50 cc. each of 2N acetic acid, and the combined aqueous extracts are rendered alkaline by means of saturated aqueous sodium chloride. The separating oil is taken up in ether, and the ether dried and evaporated. The residue, distilled under high vacuum, yields 10 g. of the new phenothiazine, which boils under 0.08 mm. Hg pressure at 203–207° C. The hydrochloride of the new phenothiazine, prepared with ethereal hydrochloric acid, is recrystallised from anhydrous ethanol/anhydrous ether and melts at 174–175° C.

In a manner analgous to that described here above there is obtained the 10-[1'-methyl-3'-β'-methylmercaptoethyl - pyrrolidyl-(3')-methyl]-3-chloro-phenothiazine, which boils under 0.05 mm. Hg pressure at 205–208° C. Its hydrochloride melts at 163–164° C.

EXAMPLE 21

The compound described in Example 2 is also obtained by heating 1,3-dimethyl-3-p-tosoxymethyl pyrrolidine and phenothiazine-lithium in pyridine for 2 hours to 100–110° C. The new phenothiazine derivative forms a fumarate, which can be recrystallised from isopropanol and melts at 166–167° C. The maleinate melts at 184–186° C., and the dihydrogen citrate, after having been recrystallised from anhydrous ethanol/anhydrous isopropanol, at 111–113° C.

What we claim is:

1. A member selected from the group consisting of a phenothiazine derivative of the formula

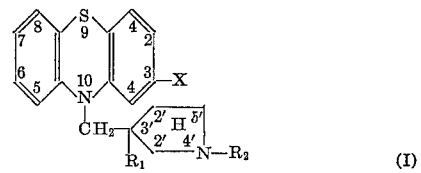

wherein X represents a member selected from the group consisting of hydrogen and chlorine, $R_1$ represents a member selected from the group consisting of methyl, ethyl, propyl, methoxyethyl and methylmercaptoethyl, and $R_2$ represents a member selected from the group consisting of methyl and ethyl, and the pharmaceutically acceptable acid addition salts of the said phenothiazine derivative.

2. 10 - [1',3'-dimethyl-pyrrolidyl-(3')-methyl]-phenothiazine.

3. 10 - [1'-methyl-3'-β'-methoxyethyl-pyrrolidyl-(3')-methyl]-phenothiazine.

4. 10 - [1',3'-dimethyl-pyrrolidyl-(3')-methyl]-3-chlorophenothiazine.

5. 10 - [1' - ethyl-3'-β'-methoxyethyl-pyrrolidyl-(3')-methyl]-phenothiazine.

6. 10 - [1' - ethyl - 3' - β'-methoxyethyl-pyrrolidyl-(3')-methyl]-3-chloro-phenothiazine.

7. 10 - [1'-methyl-3'-β'-methoxyethyl-pyrrolidyl-(3')-methyl]-3-chloro-phenothiazine.

References Cited in the file of this patent

UNITED STATES PATENTS

| | | |
|---|---|---|
| 2,826,588 | Feldkamp et al. | Mar. 11, 1958 |
| 2,931,810 | Yale et al. | Apr. 5, 1960 |
| 2,945,855 | Feldkamp et al. | July 19, 1960 |
| 2,975,193 | Dice et al. | Mar. 14, 1961 |

FOREIGN PATENTS

| | | |
|---|---|---|
| 813,428 | Great Britain | May 13, 1959 |

UNITED STATES PATENT OFFICE
CERTIFICATE OF CORRECTION

Patent No. 3,140,284                  July 7, 1964

Ernst Habicht et al.

It is hereby certified that error appears in the above numbered patent requiring correction and that the said Letters Patent should read as corrected below.

Column 1, lines 15 to 22, and column 14, lines 12 to 17, the formulae, each occurrence, should appear as shown below instead of as in the patent:

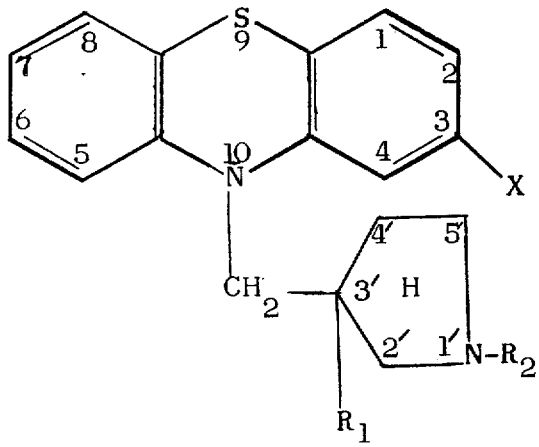

Column 2, line 34, after "solid" insert -- form --.

Signed and sealed this 1st day of December 1964.

(SEAL)
Attest:

ERNEST W. SWIDER                  EDWARD J. BRENNER
Attesting Officer                 Commissioner of Patents